US006888301B1

(12) United States Patent
Namiki et al.

(10) Patent No.: US 6,888,301 B1
(45) Date of Patent: May 3, 2005

(54) GAS-DISCHARGE DISPLAY APPARATUS HAVING OPTICAL FILTER SELECTIVELY ABSORBING LIGHT OF A WAVELENGTH EQUAL TO THAT OF THE LIGHT EMISSION OF THE DISCHARGE GAS

(75) Inventors: Fumihiro Namiki, Kawasaki (JP); Katsuya Irie, Kawasaki (JP)

(73) Assignee: Fijitsu Limited, Kawasaki (JP)

( * ) Notice: Subject to any disclaimer, the term of this patent is extended or adjusted under 35 U.S.C. 154(b) by 0 days.

(21) Appl. No.: 09/473,047

(22) Filed: Dec. 28, 1999

(30) Foreign Application Priority Data

Mar. 31, 1999 (JP) .......................................... 11-091091

(51) Int. Cl.[7] .................................................. G02B 5/20

(52) U.S. Cl. ....................... 313/489; 313/478; 313/582; 313/112; 359/614; 359/885

(58) Field of Search ................................ 313/487, 582, 313/112, 478; 359/885, 614

(56) References Cited

U.S. PATENT DOCUMENTS 4,521,524 A 6/1985 Yamashita
4,987,338 A * 1/1991 Itou et al. ................... 313/313
5,121,030 A * 6/1992 Schott ........................ 313/474
5,178,955 A * 1/1993 Aharoni et al. ............. 359/580
5,218,268 A * 6/1993 Matsuda et al. ............ 313/112
5,652,476 A * 7/1997 Matsuda et al. ............ 313/112
5,838,106 A * 11/1998 Funada ....................... 313/112
5,892,492 A * 4/1999 Osawa et al. ............... 313/485
5,939,826 A * 8/1999 Ohsawa et al. ............. 313/484
6,157,504 A * 12/2000 Yamada et al. ............. 252/582

FOREIGN PATENT DOCUMENTS

EP 0 966 017 12/1999
JP 05205643 A * 8/1993 ........... H01J/11/02
JP 09-022657 1/1997
JP 09306366 A * 11/1997 ........... H01J/11/02
JP 11-233033 8/1999
WO WO98/23980 6/1998
WO WO99/26269 5/1999

OTHER PUBLICATIONS

Patent Abstracts of Japan of JP 06255672 dated Oct. 20, 1994.

* cited by examiner

*Primary Examiner*—Nimeshkumar D. Patel
*Assistant Examiner*—Sikha Roy
(74) *Attorney, Agent, or Firm*—Staas & Halsey LLP

(57) ABSTRACT

A gas-discharge display apparatus is provided that reduces influence of light emission of the discharging gas so as to enhance a color reproducible range and make color purity of red color close to the ideal value. The apparatus uses a gas containing at least one of neon and helium for generating the gas discharge and exciting three kinds of fluorescent materials having different light colors to emit light for color image display. In front of the gas discharge space, an optical filter is disposed, whose transmittance at the wavelength of 585 nanometers is smaller than both the transmittance at the wavelength of 450 nanometers and the transmittance at the wavelength of 620 nanometers.

8 Claims, 13 Drawing Sheets

100

F i g. 3A
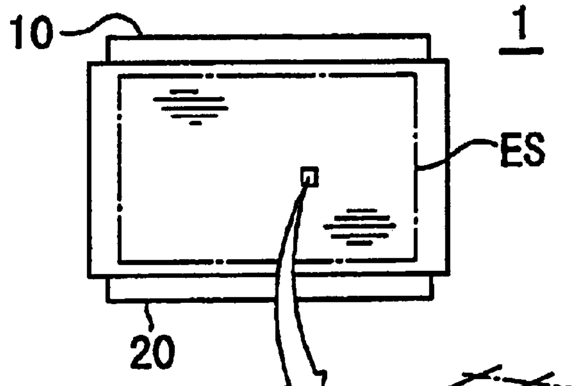
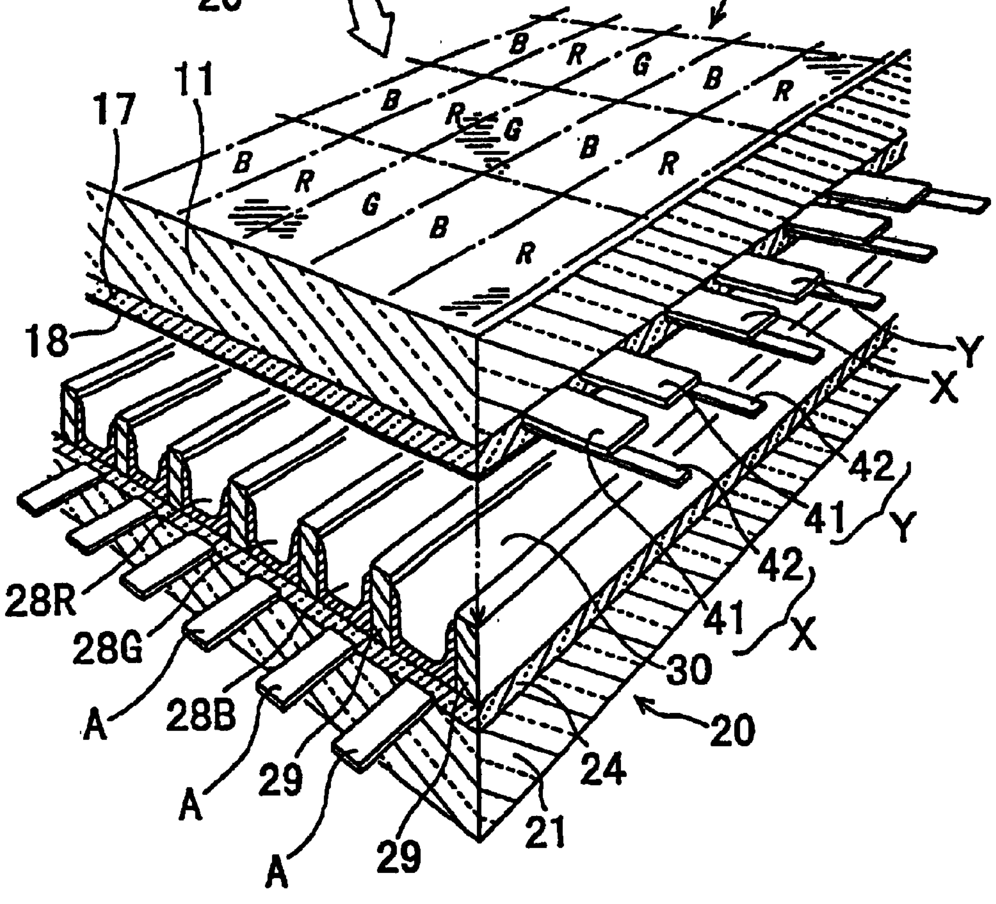
F i g. 3B

GAS-DISCHARGE DISPLAY APPARATUS HAVING OPTICAL FILTER SELECTIVELY ABSORBING LIGHT OF A WAVELENGTH EQUAL TO THAT OF THE LIGHT EMISSION OF THE DISCHARGE GAS

BACKGROUND OF THE INVENTION

1. Field of the Invention

The present invention relates to a gas-discharge display apparatus that can display color images.

A plasma display panel (PDP) that is a typical display device having a screen emitting light by gas discharge is becoming widely available as a wide screen display for a television set after the color display thereof has been succeeded in commercialization. One of the challenges to improve the image quality of PDPs is to enhance the reproducible color range.

2. Description of the prior art

As a color display device, an AC type PDP having three-electrode surface discharging structure is commercialized. This type has a pair of main electrodes for sustaining, which are arranged in parallel for each line (row) of the matrix display, and an address electrode for each column. Division walls for preventing interruption of discharge between cells are provided in stripes. A surface discharging structure includes a substrate on which the pairs of main electrodes are arranged and an opposing substrate on which a fluorescent layer for color display is arranged, so that deterioration of a fluorescent layer due to an ion impact upon discharge can be reduced to obtain a longer life. The "reflection type" that has the fluorescent layer on the back substrate is superior to the "transparent type" that has the fluorescent layer on the front substrate concerning light emission efficiency.

In general, Penning gas containing neon (Ne) and a trace of xenon (Xe) (4–5%) is used as a discharging gas. When the discharge between main electrodes occurs, the discharging gas radiates ultraviolet rays, which excite the fluorescent material to emit light. Each pixel includes three cells for red (R), green (G) and blue (B) light colors, and the display color is decided by controlling the light intensity of the fluorescent material of each color. Conventionally, the composition of the fluorescent materials and the ratio of light intensities of three colors are selected so that the display color becomes white when each of the red, green and blue color light intensities is set to the maximum within the variable range.

Concerning the composition of the discharge gas, many studies have been done, a three-component gas (Ne, Xe and He) that is a mixture of the above-mentioned Penning gas and helium, a two-component gas containing helium and xenon (He and Xe), and another three-component gas containing helium, argon and xenon (He, Ar and Xe) are known well.

As explained above, since the fluorescent material emits light by gas discharge in a PDP, the mixing of the light color of the discharge gas into the light color of the fluorescent material cannot be avoided. This causes a problem of deterioration of the color reproducibility.

FIG. 13 shows a light emission spectrum of a two-component gas containing neon and xenon. FIG. 14 is a chromaticity diagram showing influences of the neon light emission on color reproduction.

As shown in FIG. 13, a plurality of light emission spectrums appears in the visible light wavelength range above 580 nanometers. The peak of the light emission of the discharge gas (585 nanometers) is adjacent to the maximum light emission peak (590 nanometers) of the red fluorescent material. Therefore, orange color due to the light emission of the discharge gas is added regardless of the color reproduced by the fluorescent material, so the reddish display occurs over the entire screen. In FIG. 14, the inside of the triangle of the solid line connecting the color coordinates of the respective fluorescent materials, plotted with small rectangles, is the reproducible color range when the color of the gas light emission is not added. In FIG. 14, the inside of the triangle of the broken line is the color reproducible range of the PDP measured in a darkroom. The real color reproducible range is narrowed compared with the original color reproducible range. Especially, reproducibility of blue and green colors is inferior. Concerning the red color, the reproducibility is not so deteriorated since the wavelength of the gas light emission is approximate to that of the light emission of the fluorescent material. However, focusing on the light color of the fluorescent material, the red fluorescent material is different from the ideal red (620 nanometers) defined in the NTSC system. Namely, even if the influence of the gas light emission is little, it is still necessary to improve the color purity of red color. At present, there is no red fluorescent material that emits light of ideal red color and satisfies other use conditions such as efficiency of exciting ultraviolet rays and life. Green and blue fluorescent materials can emit light of substantially ideal color.

Since the display capacity of blue color is degraded by the gas light emission, the display color of white pixels has a low color temperature compared with the color reproduced by the fluorescent materials of three colors. It is difficult to optimize the relative light intensities of red, green and blue colors in consideration of relative luminosity factor by combining materials because there are few kinds of fluorescent materials that satisfy the use condition at present. Therefore, the color temperature of the white color is low compared with a CRT even if the color of the gas light emission is not added. Furthermore, if the color of the gas light emission is added, the color temperature drops further. More specifically, the color temperature of the white color display is 5,000–6,000 K under the condition of the same amplitude signal applied for red, green and blue colors, while the color temperature of a CRT for a TV set in Japan is above 10,000 K. Therefore, it is necessary to raise the color temperature of the white color. However, since the color temperature has different optimal values depending on the use of the display, the region (the country) where the display is used or other factor, it is preferable that the color temperature can be selected easily within the range of about 6,000–12,000 K.

The color temperature can be raised by weakening the relative light intensities of green and red colors to blue color. The conventional method for adjusting the color temperature and disadvantages thereof are explained below.

(1) Adjustment by Fluorescent Material:

There is a method for adjusting the relative light intensities of red, green and blue colors by selecting the fluorescent materials, a forming shape thereof (i.e., the shape in which the fluorescent material is found) or the forming area thereof (i.e., the area on which the fluorescent material is formed). This method substantially reduces the brightness of the panel since the light intensities of green and red fluorescent materials are weakened compared with that of the blue fluorescent material that is usually lacking in intensity. Furthermore, there is a limited selection of materials as mentioned above. The adjustment by the forming shape has low reproducibility. If the cell size of blue color is increased to enlarge the forming area thereof, the margin of the voltage to be applied is narrowed and the display becomes unstable since the display characteristics depend on the cell size. In addition, manufacture of panels having different light intensities of the fluorescent material in accordance with the use and the region (country) of use may deteriorate the productivity.

(2) Adjustment by Signal:

The intensity balance between the video signals of red, green and blue colors is adjusted. In an example where the level of the video signal is represented by eight bits, i.e. 0–255, the maximum intensities of blue, green and red are represented by 255, 200 and 180, respectively so as to display white color of the maximum intensity. Thus, the color temperature of white color is raised by reducing the amplitude of the input signal of green and red colors compared with that of blue color. This method reduces the brightness of the panel in the same manner as the method (1) mentioned above, and degrades the capacity of gradation display of green and red colors compared with that of blue color that can be displayed in 256 steps of gradation.

Another problem about the color temperature is that contrast in a well-lighted room is low. The contrast in a well-lighted room (hereinafter, referred to as the bright-room contrast) means a ratio of intensity of light emitted by the fluorescent material and intensity of external light reflected by the PDP. In general, PDPs have a large reflection ratio of external light and a small value of the bright-room contrast. It is clear that the bright-room contrast will be improved by raising the light intensity of the panel and reducing the reflection ratio of external light, but it is not easy to satisfy the compatibility between them. For example, improvement of the filter for EMI measure is considered. Usually, the front surface of the PDP is provided with a filter having transmittance of 40–70% over the entire region of visible light wavelength for protecting interference of electromagnetic field. Though the light emitted inside the panel passes through the filter only once, the external light passes through the filter twice, once each in both directions. Therefore, the filter improves the bright-room contrast. If the filter having less transmittance is used, the bright-room contrast is further improved. However, since the improvement of the color temperature by the above-mentioned method will reduce the light intensity of the panel, the filter having low transmittance cannot be used for improving the bright-room contrast.

SUMMARY OF THE INVENTION

The object of the present invention is to reduce the influence of the light emission of the discharge gas for enlarging the color reproducible range, and to cause the color purity of red color to approach the ideal value. Another object of the present invention is to prevent reduction of the color temperature of white color. Still another object of the present invention is to raise the contrast without reducing the display brightness.

In the present invention, an optical filter having a size uniformly covering the entire screen is arranged in an appropriate position. The optical filter has characteristics of selectively absorbing visible light having a wavelength within the overlapped range of the light emission wavelength range of neon or helium and the light emission wavelength range of red fluorescent material.

Light within the wavelength range that can deteriorate the color reproducibility in the light emitted inside is selectively absorbed. Since the optical filter makes the proper color reproducibility, each of the fluorescent materials having different light colors can emit light with the maximum intensity in white color, for example. The placement of the optical filter covering the entire screen is much easier than providing a color filter for each light color of the fluorescent material.

According to a first aspect of the present invention, a gas-discharge display apparatus is provided which utilizes at least one of neon and helium gases to generate gas discharge for exciting three kinds of fluorescent materials having different light colors to emit light for displaying a color image. The apparatus includes an optical filter that is an element overlapping the entire screen, being disposed in front of gas discharge space for selectively absorbing light having wavelength equal to that of light emission of the gas. The optical filter has characteristics in which the transmittance $T_{585}$ at the wavelength of 585 nanometers is smaller than the transmittance $T_{450}$ at the wavelength of 450 nanometers and the transmittance $T_{620}$ at the wavelength of 620 nanometers.

In a second aspect of the present invention, the optical filter has characteristics in which the wavelength of peak absorbency in the visible light wavelength range has a value within the range of 550 to 620 nanometers.

According to a third aspect of the present invention, the apparatus includes an optical filter that is an element overlapping the entire screen, being disposed in front of gas discharge space for selectively absorbing light having wavelength equal to that of light emission of the gas. The optical filter has characteristics in which first and second peak absorbencies exist in the visible light wavelength range. The wavelength of the first peak absorbency has a value within the range of 550 to 620 nanometers, and the wavelength of the second peak absorbency has a value within the range of 500 to 550 nanometers.

In a fourth aspect of the present invention, the optical filter has characteristics in which first and second peak absorbencies exist in the visible light wavelength range, the transmittance $T_{585}$ at the wavelength of 585 nanometers is smaller than the transmittance $T_{450}$ at the wavelength of 450 nanometers and the transmittance $T_{620}$ at the wavelength of 620 nanometers, and the transmittance $T_{528}$ at the wavelength of 525 nanometers is smaller than the transmittance $T_{450}$.

In a fifth aspect of the present invention, the transmittance $T_{585}$ is smaller than 0.7 times the transmittance $T_{450}$.

In a sixth aspect of the present invention, the transmittance $T_{585}$ is smaller than 0.7 times the transmittance $T_{450}$ and is smaller than the transmittance $T_{525}$.

According to a seventh aspect of the present invention, the apparatus includes an optical filter that is an element overlapping the entire screen, being disposed in front of gas discharge space for selectively absorbing light having wavelength equal to that of light emission of the gas. The optical filter has characteristics in which first and second peak absorbencies exist in the visible light wavelength range. The wavelength of the first peak absorbency has a value within the range of 580 to 600 nanometers. The wavelength of the second peak absorbency has a value within the range of 500 to 550 nanometers. The transmittance of the optical filter at the first peak absorbency is smaller cog than 0.5 times the average transmittance in the blue wavelength range. The average transmittance in the green wavelength range is larger than the transmittance at the first peak absorbency and is smaller than the average transmittance in the blue wavelength range.

In an eighth aspect of the present invention, the optical filter is made as a component separate from a display device having the gas discharge space, and is disposed in front of the display device.

In a ninth aspect of the present invention, the optical filter is made of a film having said characteristics.

In a tenth aspect of the present invention, the optical filter is in contact with the front surface of a transparent substrate making up the screen.

In an eleventh aspect of the present invention, the optical filter is made of an organic resin in which a substance absorbing light of a specific wavelength is dispersed.

In a twelfth aspect of the present invention, a non-glare layer is disposed in front of the optical filter.

BRIEF DESCRIPTION OF THE DRAWINGS

FIG. 3A is a schematic view of a planar display apparatus.

FIG. 3B is an exploded view of a representative portion of the PDP of FIG. 3A illustrating an internal construction of same according to the present invention.

DESCRIPTION OF THE PREFERRED EMBODIMENTS

Hereinafter, the present invention will be explained more in detail with reference to embodiments and drawings.

Figure 1:
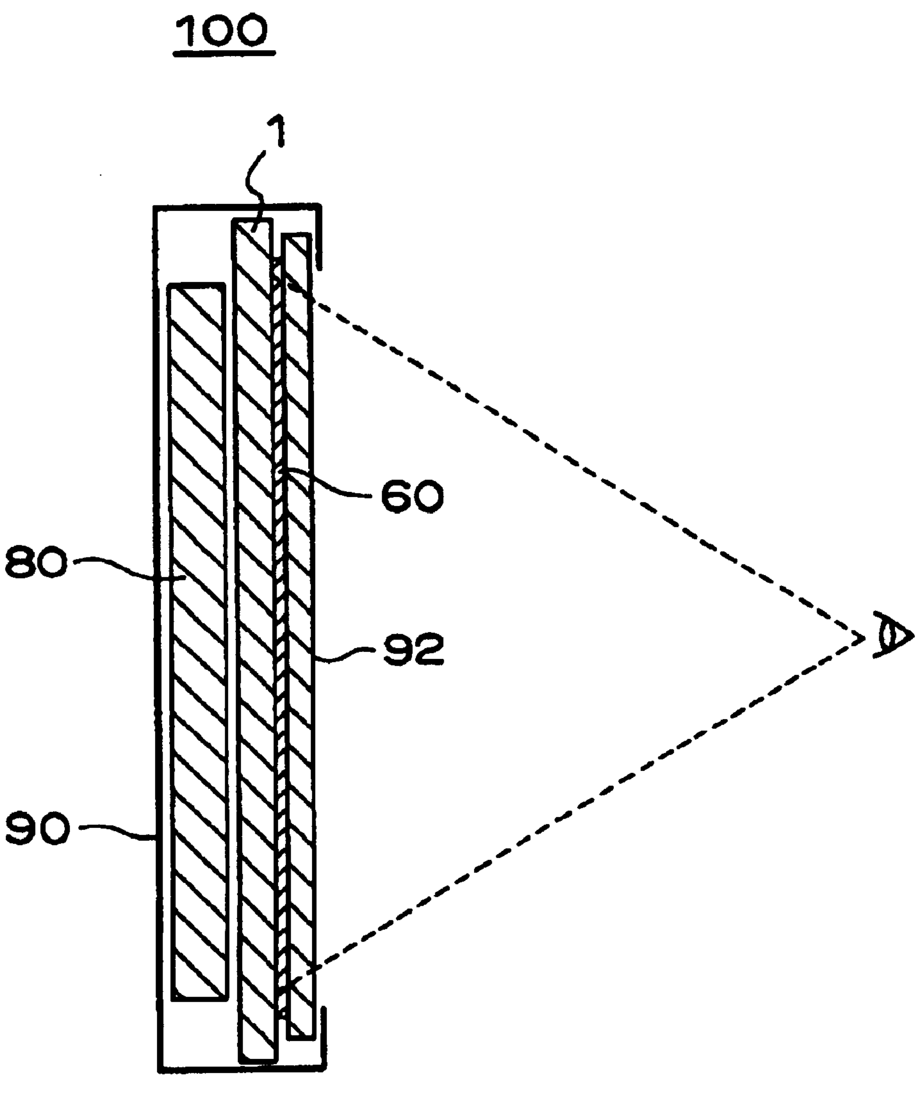
FIG. 1 shows a structure of a plasma display apparatus according to the present invention.

FIG. 1 shows a structure of a plasma display apparatus 100 according to the present invention.

The plasma display apparatus 100 includes a PDP 1 that is a color display device, a driving unit 80 for lighting cells of the PDP 1 in accordance with display contents, an optical filter 60 having a spectrum transparent characteristic unique to the present invention, a front plate 92 for protecting the PDP 1, and an armor cover 90. The front plate 92 is made up by providing an electromagnetic field shield film and an infrared cutting filter onto a substrate that is optically transparent, and applying a surface treatment for non-glare finish. Glass, acrylic resin, polycarbonate, or other materials can be used for making the substrate.

The optical filter 60 has a dimension covering the entire screen that is a set of cells in the PDP 1, and is in intimate contact with the front surface of the PDP 1. The optical filter 60 can be formed by a process such as sticking (i.e., adhering) a laminated filter film, sticking a film in which a pigment or a colorant is dispersed, or laminating a multi-coated interference film utilizing thin film technology on the front surface of the PDP 1 directly, or on the front plate 92 so as to overlay the surface of the PDP 1. Characteristics of the optical filter 60 and the front plate 92 are uniform over the entire screen.

Figure 2A:
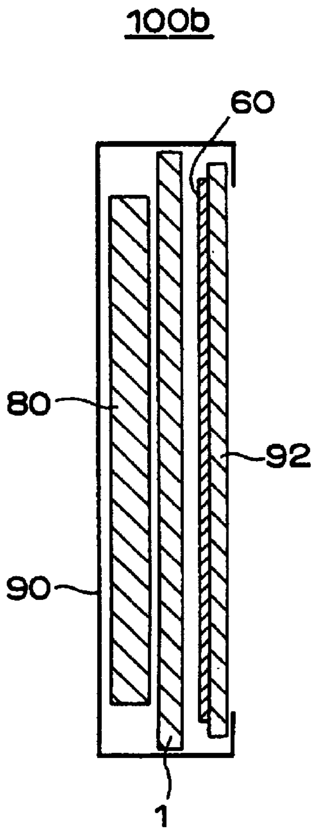
FIGS. 2A and 2B show structures of other plasma display apparatuses.
Figure 2B:
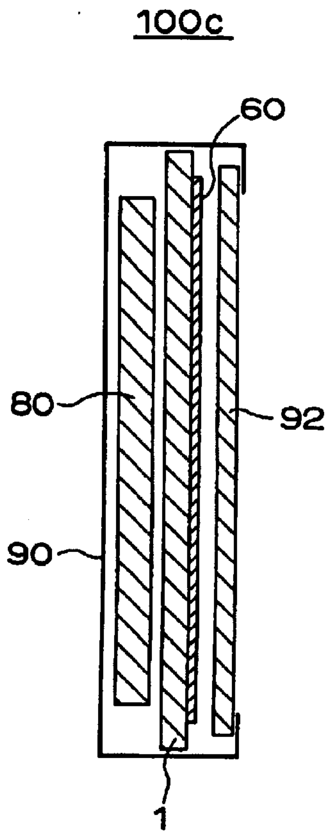

FIGS. 2A and 2B show structures of other plasma display apparatuses having various different arrangements of the optical filter.

In the plasma display apparatus **100*b* shown in FIG. 2A, is A the optical filter 60 contacts the back surface of the front plate 92 intimately, and is separated from the PDP 1. This configuration has an advantage in that the front plate 92 absorbs an external shock, so that the PDP 1 cannot be broken down easily. In addition, heat sink effect can be expected, i.e., the gap between the PDP 1 and the front plate 92** with the optical filter can be used as an air duct, in which external air or cooling air forced by a cooling fan can flow so as to prevent the PDP from being heated.

In the plasma display apparatus **100*c* shown in FIG. 2B, the optical filter 60 contacts the PDP 1 intimately, and the front plate 92 is separated from the optical filter 60 so as to enhance protection effect. The optical filter 60** is formed by sticking a film, and a non-glare finish is performed before the sticking, so as to reduce an optical interface by which external light is reflected. The non-glare finish is preferably AG process that makes an image soft and inconspicuous by light diffusion. If AR process is used, regular reflection ratio can be reduced substantially, but an external image can be reflected clearly.

In the above-explained three examples, the optical filter 60 is disposed between the PDP 1 and the front plate 92. However, the optical filter 60 can be disposed in front of the front plate 92. If the optical filter 60 is disposed in front of the light emitting portion of the PDP 1, the optical filter 60 can be formed inside the PDP 1.

FIG. 3A Is a schematic view of a planar display apparatus.

FIG. 3B is an exploded view of a representative portion of the PDP of FIG. 3A, illustrating an internal construction of same according to the present Invention.

The PDP 1 has first and second main electrodes X and Y making a pair arranged in parallel for generating a sustaining discharge. In each cell (display element), the main electrodes X, Y and an address electrode A as a third electrode cross to make a three-electrode surface discharge structure. The main electrodes X and Y extend in the row direction of the screen (the horizontal direction), and the second main electrode Y is used as a scan electrode for selecting-cells in a row upon addressing. The address electrode A extends in the column direction (the vertical direction), and is used as a data electrode for selecting cells in a column. The area of the substrate where the main electrodes and the address electrodes cross is the display screen.

In the PDP 1, a pair of main electrodes×and Y is arranged in each row on the inner surface of a glass substrate 11 that is a substrate of a front substrate structure 10. The row is a line of cells in the horizontal direction of the screen. Each of the main electrodes X and Y includes a transparent conductive film 41 and a metal film (a bus conductor) 42, and is covered with an insulating layer 17 having a thickness of approximately 30 microns made of low-melting glass. The surface of the insulating layer 17 is coated with a protection film 18 made of magnesia (MgO) having a thickness of several thousands angstroms. The address electrodes A are arranged on the inner surface of a glass substrate 21 that is a substrate of a rear substrate structure 20, and is covered with an insulating layer 24 having a thickness of approximately 10 microns. On the insulating layer 24, a division wall 29 having a shape like a band of height 150 microns viewed from the top is disposed at each space between the neighboring address electrodes. These division walls 29 divide the discharging space 30 in the row direction into plural subpixels (plural unit lighting regions), and define the gap size of the discharging space 30. In addition, red fluorescent material 28R, green fluorescent material 28G and blue fluorescent material 28B for color display are arranged coating the inner surface of the rear side including the upper portion of the address electrode A and the side surface of the division wall 29, so that the three colors are arranged in a periodic pattern. The fluorescent materials 28R, 28G and 28B are selected so that white color is reproduced when each of them emits light in the maximum intensity, and the forming shapes of them are the same. A preferred example of the fluorescent materials is shown in TABLE 1.

TABLE 1

PREFERRED FLUORESCENT MATERIALS

| Light Emission Color | Fluorescent Material |
|---|---|
| Red | (Y, Gd)$BO_3$: Eu |
| Green | $Zn_2SiO_4$: Mn |
| Blue | $BaMgAl_{19}O_{17}$: Eu |

The discharging space 30 is filled with a discharging gas containing neon as a base and xenon (4–5%), and each color of the fluorescent materials 28R, 28G and 28B is partially exited by ultraviolet rays emitted by xenon upon discharging so as to emit light. In the plasma display EA apparatus 100 according to the present invention, a color balance of red, green and blue colors can be adjusted by designing the characteristics of the optical filter 60. Therefore, it is not required to select the fluorescent materials severely or to adjust the forming shape of the fluorescent material of each color for optimizing the color balance.

One element of display (a pixel) includes three subpixels having different light colors arranged in the row direction. The structure of each subpixel is the cell. Since the division walls 29 are arranged in a stripe pattern, the portion of the discharging space 30 corresponding to each column is continuous over all rows. An electrode gap between neighboring rows is set to a value substantially larger than the surface discharge gap (e.g., 80–140 microns), which can prevent discharge connection in the column direction, e.g. a value within a range of 400–500 microns. The address discharge is generated between the main electrode Y and the address electrode A of a cell to be lightened (in the case of write address format) or a cell to be not lightened (in the case of erase address format), so that a charged state is formed in each row where only the cells to be lightened have an appropriate quantity of wall discharge. Then, a sustaining voltage $V_S$ is applied between the main electrodes X and Y, so that the cells to be lightened can generate surface discharge.

Figure 13:
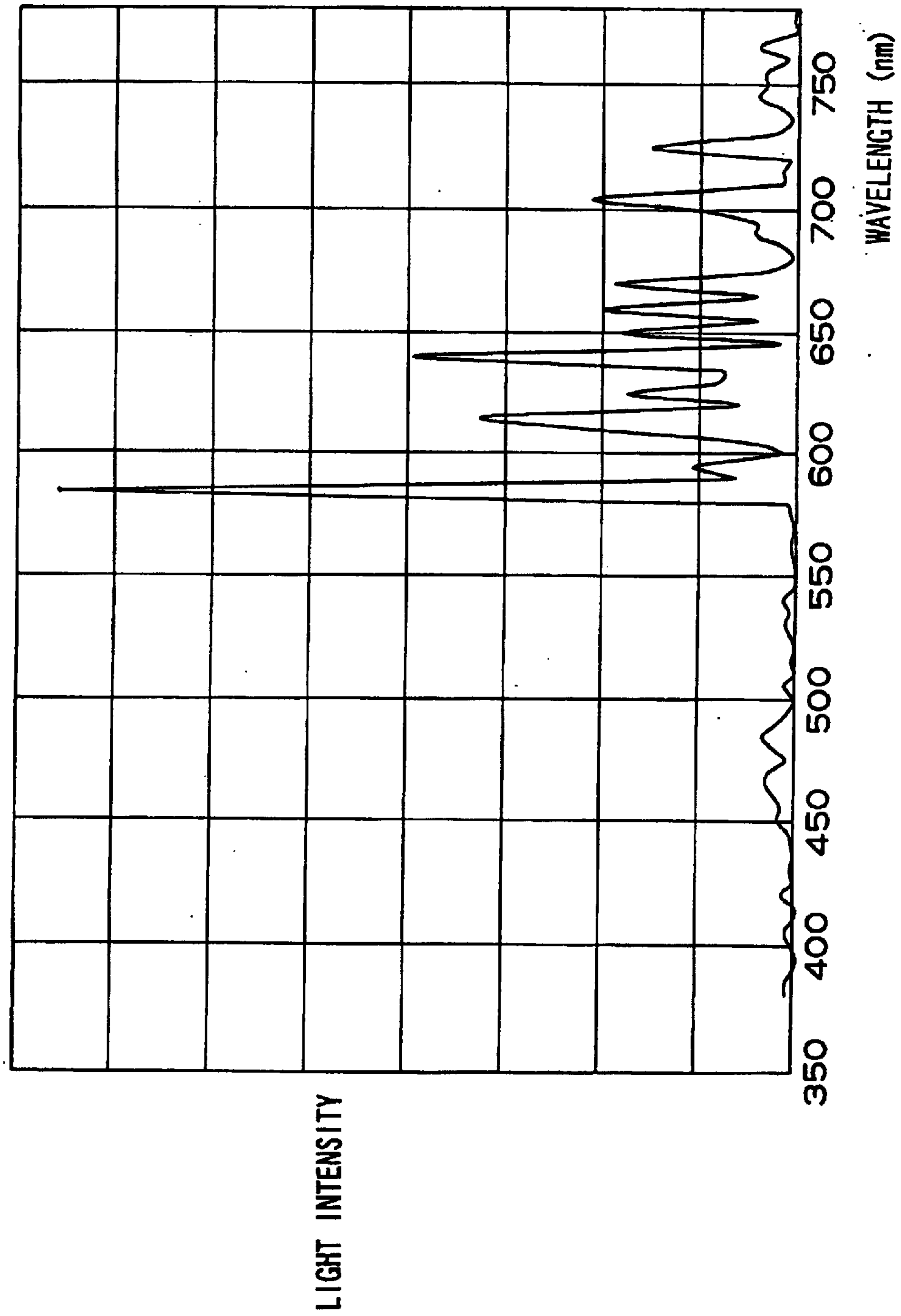
FIG. 13 shows a light emission spectrum of a two-component gas containing neon and xenon.
Figure 14:
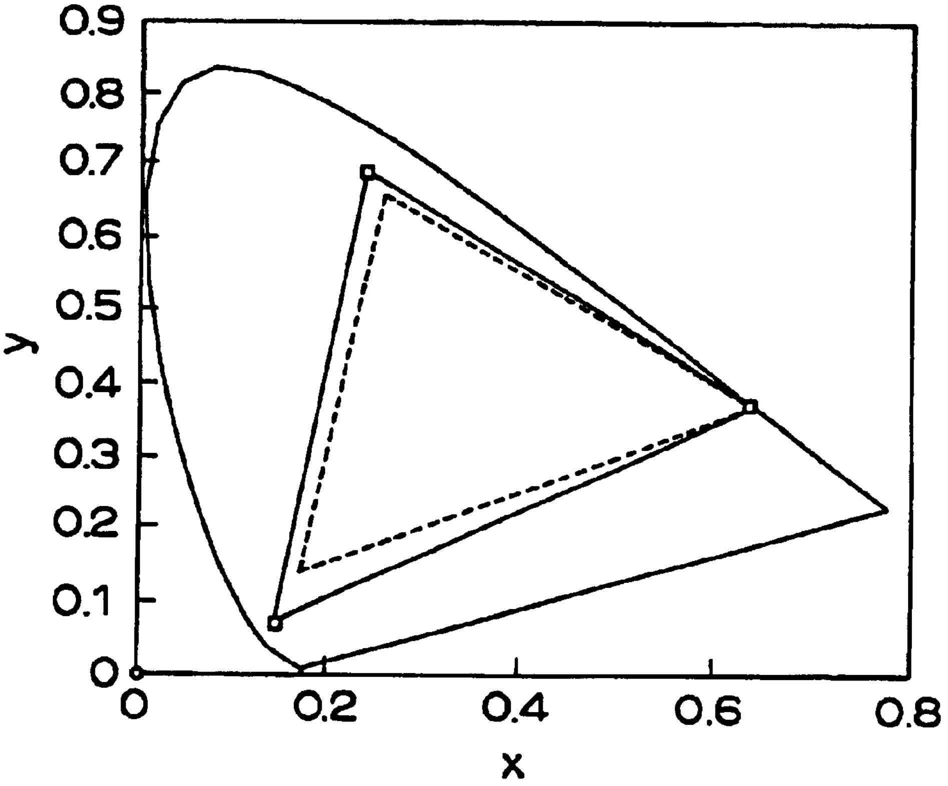
FIG. 14 is a chromaticity diagram showing influences of the neon light emission to color reproduction.

Hereinafter, characteristics of the optical filter 60 will be explained. In the following explanation, Ne-Xe (4%) Penning gas is used as the discharging gas, which emits light having the spectrum shown in FIG. 13. However, any gas containing helium (He) or krypton (Kr) can be used as the discharging gas regardless of whether neon is contained or not. Helium and krypton emit light having a wavelength in the range of 580~600 nanometers in the same way as neon, so the optical filter 60 of the present invention having wavelength selecting property is effective.

Figure 4A:
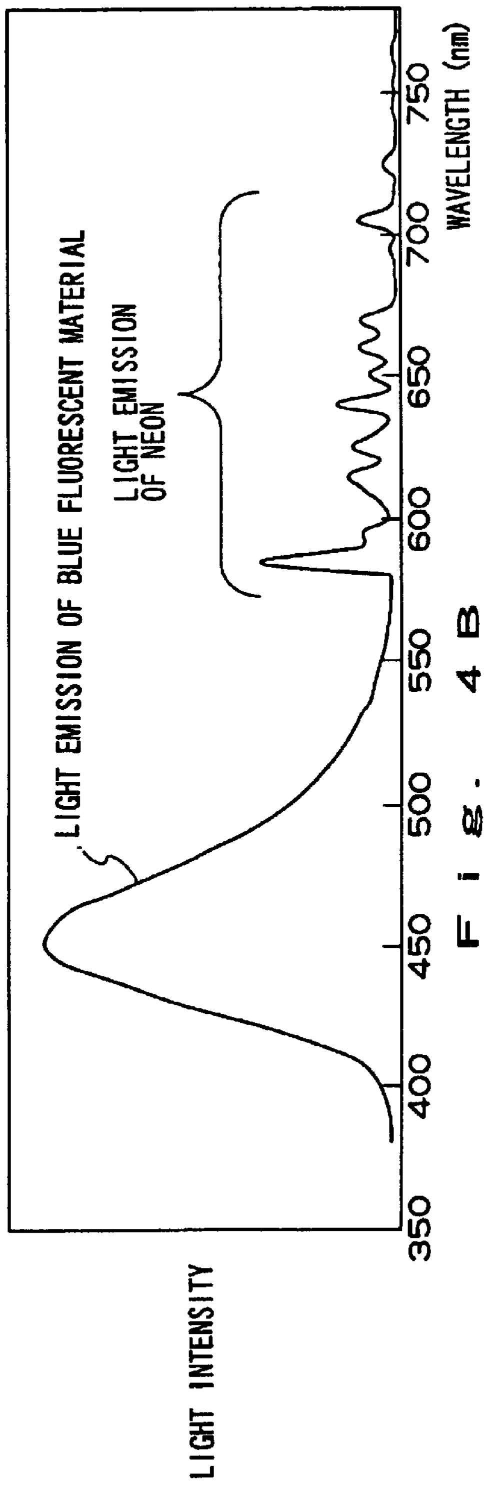
FIGS. 4A and 4B show the light emission spectrums of blue and red displays.
Figure 4B:
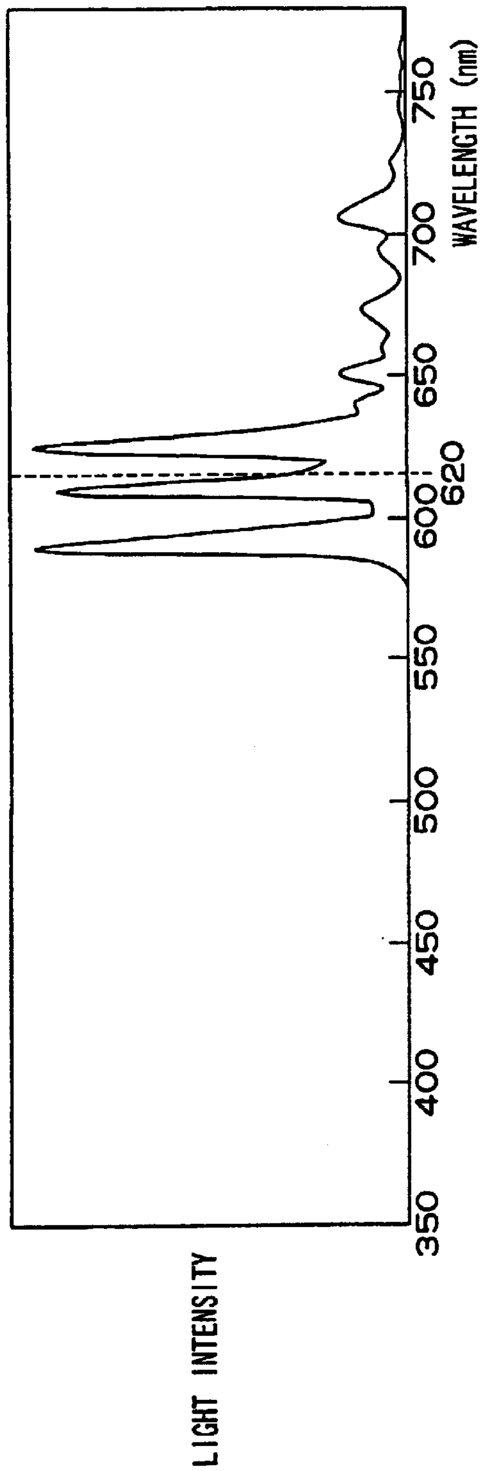

FIGS. 4A and 4B show the light emission spectrums of blue and red displays.

As shown in FIG. 4A, the light emission spectrum, in which only the blue fluorescent material 28B is excited to emit light, includes a light emission spectrum of the fluorescent material in the wavelength range of 400–550 nanometers, as well as a light emission spectrum of neon in the wavelength range above 580 nanometers. If this light emission above 580 nanometers can be eliminated by the filter, purity of blue color will be improved. However, as shown in FIG. 4B, the light emission spectrum of the red fluorescent material 28R has substantially three peaks at wavelengths of 595 nanometers, 610 nanometers and 625 nanometers, and the distribution range is substantially overlapped with that of the light emission spectrum of neon. Therefore, the filter that eliminates entire light emission spectrum of neon also eliminates the light emission of red color, and causes substantial deterioration of intensity of red display.

The inventors have studied about the wavelength range to be eliminated, and obtained the following result. Namely, if the wavelength spectrum of the light emission spectrum in which the product of the light intensity and the relative luminosity factor becomes the maximum, i.e., 585 nanometers and the surrounding wavelength spectrum are eliminated, the purities of blue and green colors can be improved along with suppressing the deterioration of red color intensity, the latter result being achieved, at a minimum. In addition, the spectrum of red light emission approaches the monochrome light emission of 620 nanometers that Is the ideal in the NTSC standard.

Figure 5:
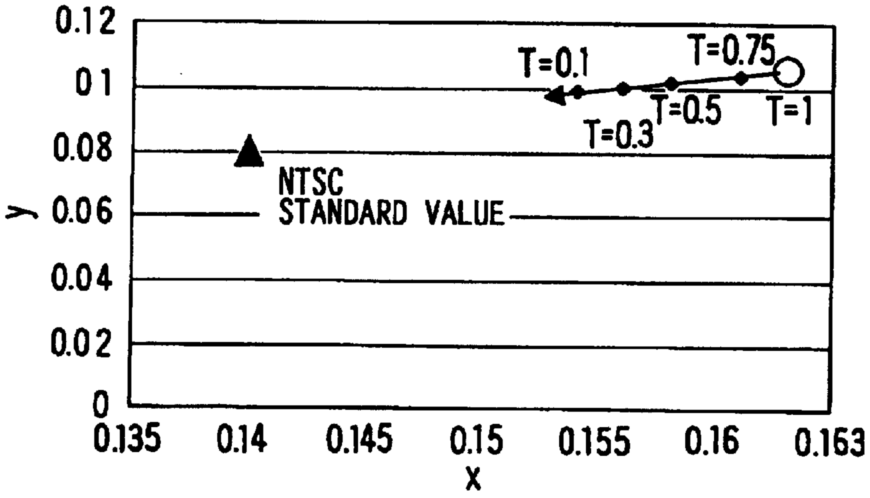
FIG. 5 is a chromaticity diagram showing the result of the filter having a peak absorbency wavelength of 590 nanometers in blue color display.
Figure 6:
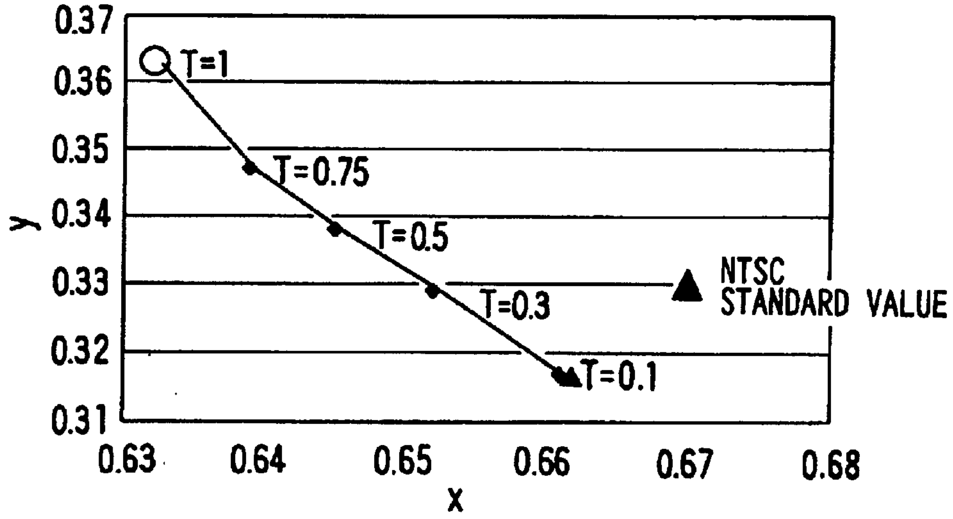
FIG. 6 is a chromaticity diagram showing the result of the filter having a peak absorbency wavelength of 590 manometers in red color display.
Figure 7:
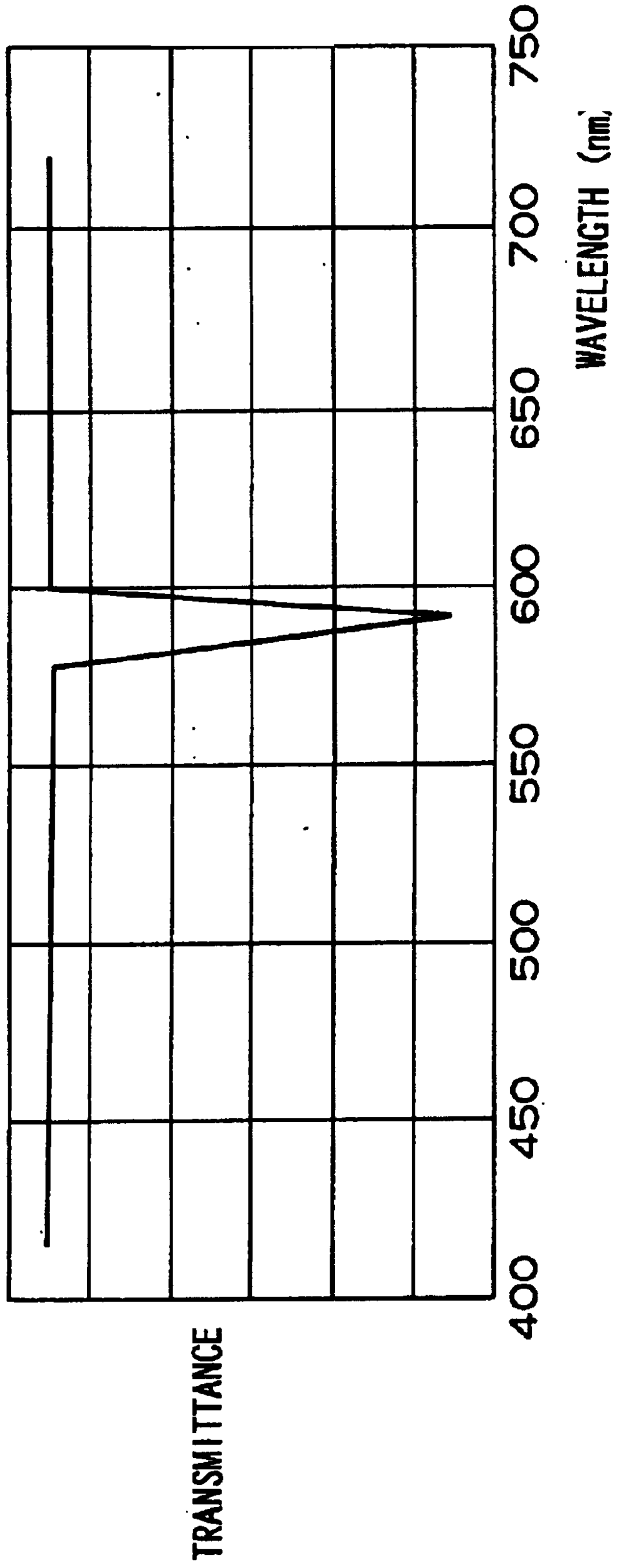
FIG. 7 shows schematically the characteristics of the filter according to the present invention.

FIG. 5 is a chromaticity diagram showing the result of a filter having a peak absorbency wavelength of 590 nanometers in blue color display. FIG. 6 is a chromaticity diagram showing the result of the filter having a peak absorbency wavelength of 590 nanometers In red color display. Here, an imaginary filter having an ideal absorbency characteristics as shown in FIG. 7 is supposed for studying about the relationship between the transmittance T and the chromaticity at the peak absorbency.

As shown in FIG. 5, the chromaticity of blue color is improved and approaches the ideal value (NTSC standard) when the transmittance at the peak absorbency decreases. In the same way for red color, as shown in FIG. 6, the chromaticity approaches the ideal value along with the transmittance being decreased.

Figure 8:
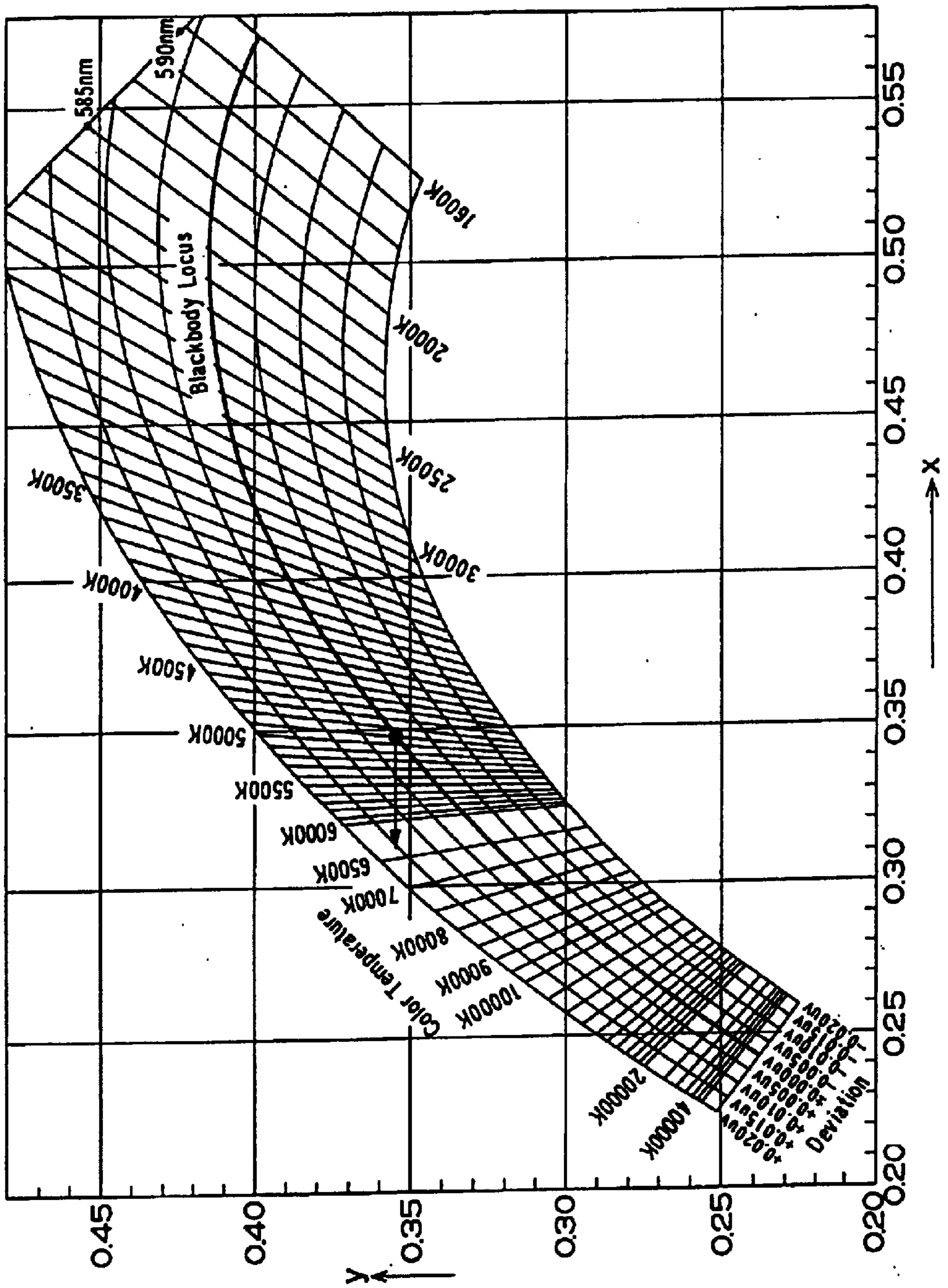
FIG. 8 shows the change of color temperature along with absorption of light having the wavelength of 590 nanometers.

The improvement of the color temperature will be explained next. As explained above, if a filter that absorbs light having a wavelength around 590 nanometers is provided, the light intensity of red color decreases and the coordinate of the white color on the chromaticity diagram moves in the direction in which the x value decreases. In other words, the color temperature increases as the arrow in FIG. 8 shows. It Is desirable that the chromaticity coordinate in white color be on the blackbody radiation curve shown by the thick line in the figure. However, if the light intensity of only red color is attenuated, deviation from the blackbody radiation in the Y-axis direction increases along with the increase of the attenuation. When the chromaticity coordinate shifts in the direction that Y value Increases from the blackbody radiation curve, white color becomes greeny white. When the chromaticity coordinate shifts in the direction that the Y value decreases, the white color starts to contain a little purple. Neither change of white color is desirable. In order to solve this problem, the filter preferably has a characteristic having peak absorbency in the green color wavelength range, too. The transmittance of the filter is set so that the light intensity of the green color decreases to the extent corresponding to the decrease of red color, so that the chromaticity coordinate of the white color can be corrected to be a coordinate on the blackbody radiation curve. Such adjustment of color temperature, though it causes decrease of light intensity due to transparency of the filter, has advantages in that the bright-room contrast is improved in contrast to the adjustment of the signal amplitude that is adopted in the conventional technique, and in that the optimal color temperature can be realized easily in accordance with the use only by changing the filter characteristic. The reason why the bright-room contrast is improved is as follows.

When $L_0$ is light intensity ratio at the front surface of the PDP 1, T is transmittance of the optical filter 60, S is illumination of external light at the front surface of the optical filter 60, and R is diffuse reflection ratio at the front surface of the PDP 1, a contrast ratio can be derived from the following equation.

CONTRAST RATIO=(LIGHT INTENSITY AFTER PASSING THE FILTER)/(REFLECTION INTENSITY OF EXTERNAL LIGHT)

$$=(L_0 \times T+S/\pi \times R \times T2)/(S/\pi \times R \times T2)$$

$$=(L_0+S/\pi \times R \times T)/(S/\pi \times R \times T)$$

$$=L_0/(S/\pi \times R \times T+1$$

Supposing that R and S are constants, the larger $L_0$ is or the smaller T is, the larger the contrast ratio becomes. The improvement of the color purity and the adjustment of the color temperature according to the present Invention do not reduce the light intensity $L_0$, since the adjustment of fluorescent material, the cell structure, and the signal amplitude. In addition, the improvement of the color purity and the adjustment of the color temperature are achieved by reducing the transmittance T, so that the bright-room contrast is Improved.

Figure 9:
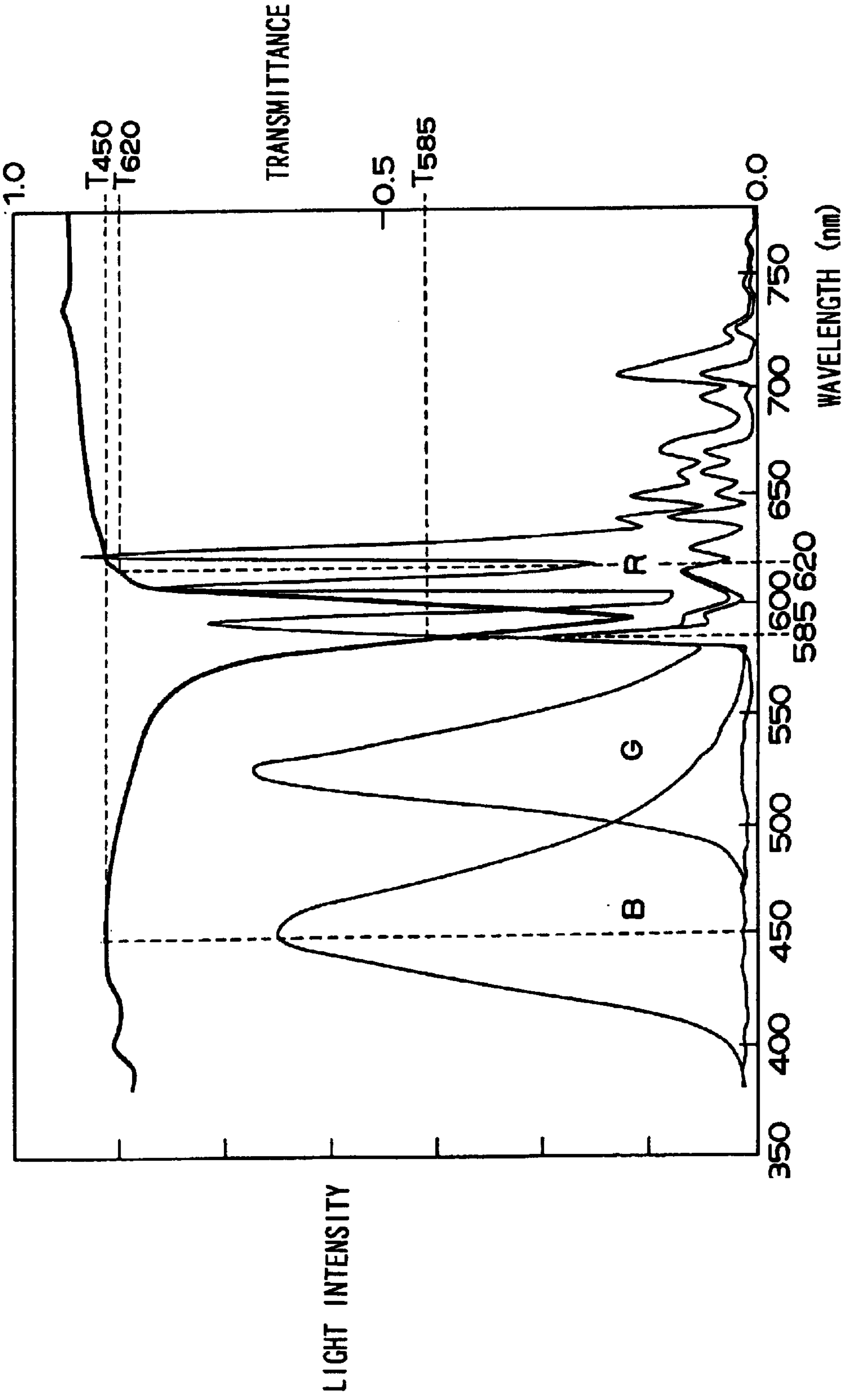
FIG. 9 shows a first example of the characteristics of the optical filter.

FIG. 9 shows a first example of the characteristics of the optical filter 60. In FIG. 9, the transparency is shown by a thick solid line and the light emission spectrum of the fluorescent material is shown by a thin solid line for a reference.

As shown in FIG. 9, the peak absorbency wavelength in the visible light wavelength range is 590 nanometers, a value within the range of 550–620 nanometers. The transmittance $T_{585}$ at the wavelength of 585 nanometers is smaller than both the transmittance Toss at the wavelength of 450 nanometers and the transmittance $T_{620}$ at the wavelength of 620 nanometers.

Such characteristics are obtained by forming a pigment layer that can absorb light of the wavelength 585 nanometers on a polyethylene film having thickness of 200 microns. As the pigment, 1-Ethyl-4-[(1-ethyl-4(1H)-quinolinylidene) methyl]quinolinium iodide whose peak absorbency (Absorption Maximum) is 590 nanometers (KABUSIKIGAISHA NIPPON KANKOUSHIKISO KENKYUUSHO Product Number NK-6), and 3-Ethyl-2-[3-(1-ethyl-4(1H)-quinolinylidene)-1-propenyl]benzoxazolium iodide whose peak absorbency is 594 nanometers (KABUSIKIGAISBA NIPPON KANKOUSHIKISO KENKYUUSHO Product Number NK-741) can be used. By adjusting the quantity of additives of these and other pigments, desired characteristics can be achieved. Though it is ideal for selectively absorbing light emitted by the discharging gas that the peak absorbency wavelength of the filter is identical to the gas light emission wavelength, some beneficial result can be obtained if the peak absorbency is in the range of approximately 550–620 nanometers. However, if the difference between the peak absorbency wavelength and the gas light emission wavelength is large, the absorbency wavelength range should be widened, resulting in increase of filter color. Therefore, the appropriate value of the peak absorbency wavelength is in the range of 580~600 nanometers.

Figure 10:
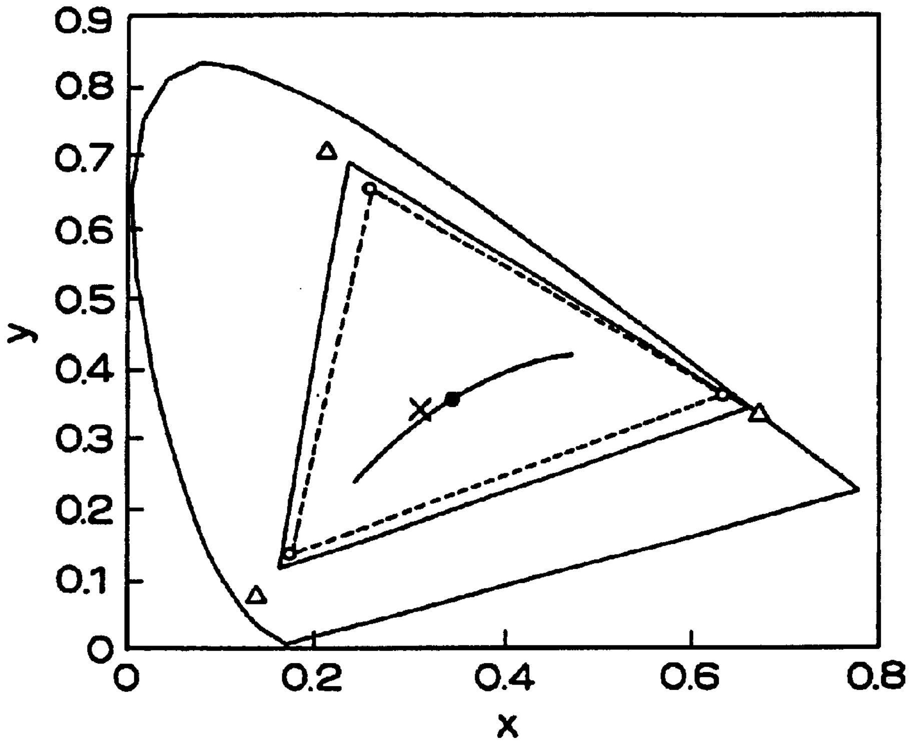
FIG. 10 is a chromaticity diagram showing the color reproducible range corresponding to the characteristics of FIG. 9.

FIG. 10 is a chromaticity diagram showing the color reproducible range corresponding to the characteristics of FIG. 9. The color reproducible range connecting the chromaticity points of red, greenland blue colors without the optical filter 60 is shown by the triangle in the broken line, and the chromaticity coordinate of white color is shown by the black dot. The color reproducible range with the optical filter 60 is shown by the triangle in the solid line, and the chromaticity coordinate of white color is shown by the x mark.

It is understood that the color reproducible range is enlarged in all ranges of red, green and blue colors, and the chromaticity coordinate of the white color is reduced both in X and Y (i.e., the color temperature is raised). The color temperature is raised from 5,000 K to 7,000 K. However, the chromaticity coordinate of white color is a little shifted upward from the blackbody radiation curve shown in the solid line to be greeny white color.

Figure 11:
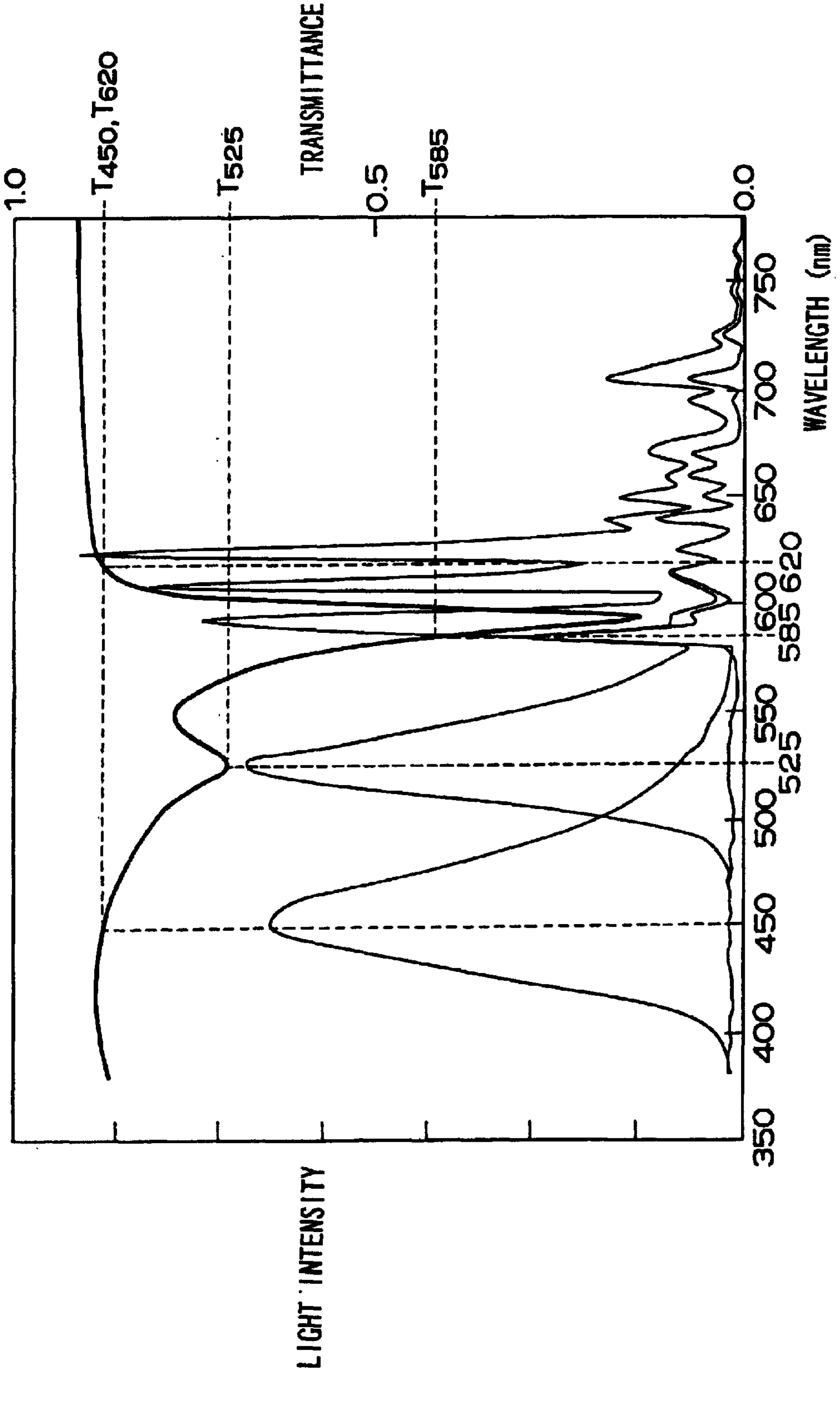
FIG. 11 shows a second example of the characteristics of the optical filter.

FIG. 11 shows a second example of the characteristics of the optical filter 60. In FIG. 11, the transparency is shown by a thick solid line and the light emission spectrum of the fluorescent material is shown by a thin solid line for a reference.

In the characteristics of FIG. 11, an absorbency is added whose peak wavelength is close to the wavelength of 525 nanometers, that is, a light emission peak wavelength of the green color fluorescent material 28G so as to solve the problem of the color temperature in the characteristics of FIG. 9. Namely, a first peak absorbency wavelength is a value within the range of 550–620 nanometers (585 nanometers), and a second peak absorbency wavelength is a value within the range of 500–550 nanometers (525 nanometers). The transmittance $T_{585}$ at the wavelength of 585 nanometers is smaller than both the transmittance $T_{450}$ at the wavelength of 450 nanometers and the transmittance $T_{620}$ at the wavelength of 620 nanometers. In addition, the transmittance $T_{525}$ at the wavelength of 525 nanometers is smaller than the transmittance $T_{450}$. Particularly, the transmittance $T_{585}$ is smaller than 0.7 times the transmittance $T_{450}$ and is smaller than 0.5 times the average transmittance In the blue color wavelength range (distributed light emission of blue color fluorescent material).

Figure 12:
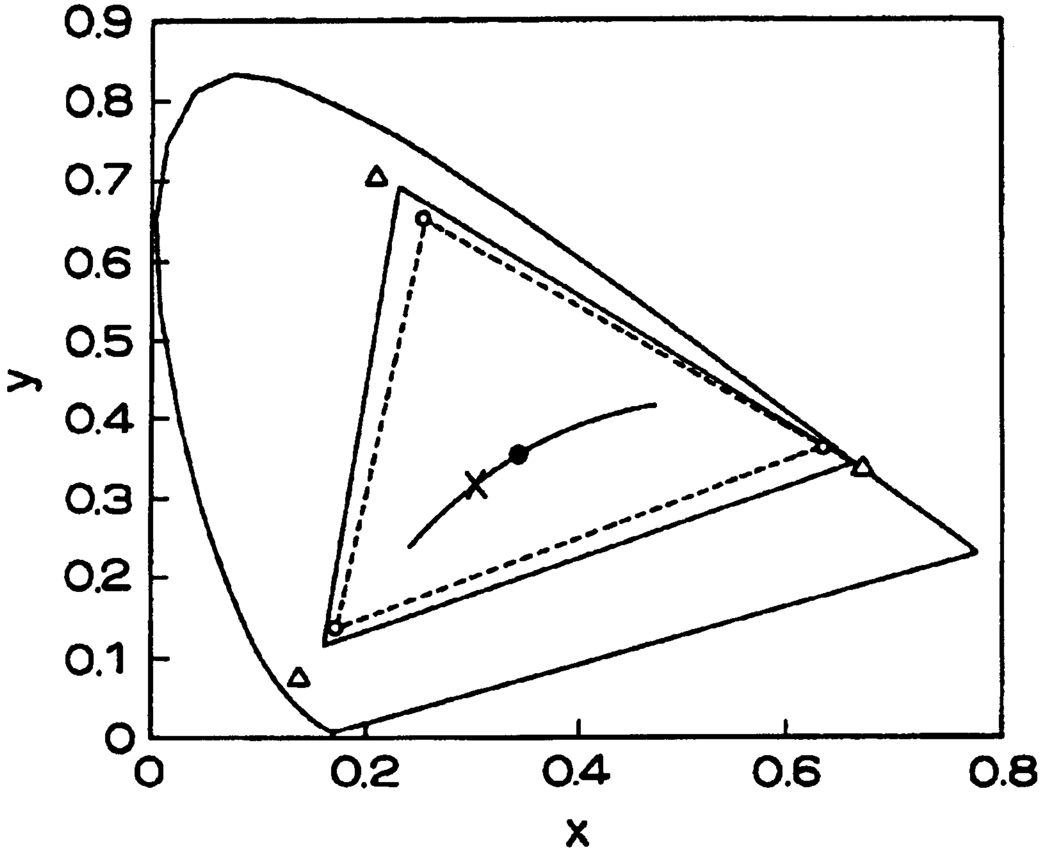
FIG. 12 is a chromaticity diagram showing the color reproducible range corresponding to the characteristic of FIG. 11.

FIG. 12 is a chromaticity diagram showing the color reproducible range corresponding to the characteristics of FIG. 11. In FIG. 12, the color reproducible range connecting the chromaticity points of red, green and blue colors without the optical filter 60 is shown by the triangle in the broken line, and the chromaticity coordinate of white color is shown by the black dot. The color reproducible range in the state with the optical filter 60 is shown by the triangle in the solid line, and the chromaticity coordinate of white color is shown by the x mark.

It is understood that the color reproducible range is enlarged in all ranges of red, green and blue colors, and the chromaticity coordinate of the white color is reduced both in X and Y (i.e., the color temperature is raised). The color temperature is raised from 5,000 K to 7,000 K. In addition, the chromaticity coordinate of white color is on the black-body radiation curve, to be ideal coordinate. Furthermore, the bright-room contrast when the illumination of the PDP 1 at the front surface is 3001*x* is further improved from 20:1 to 40:1 by the arrangement of the optical filter 60 having the characteristics shown in FIG. 11.

The color temperature can be adjusted to any value within the range of 5,000–13,000 K by controlling the spectrum transparent characteristic of the optical filter 60. More specifically, if the absorption quantity around 590 nanometers in FIG. 11 is increased so that the transmittance becomes less than 10%, a color temperature above 10,000 K can be achieved and the same performance as a CRT for TV set can be realized. If the absorption quantity around 590 nanometers is decreased to that the transmittance becomes approximately 50%, a color temperature about 6,500 K can be achieved and the same performance as that of a CRT for publishing or designing use or a CRT for a TV set used in Europe can be realized. Namely, a display apparatus having the optimum color reproducibility for use and area (country) can be provided by changing the spectrum transparent characteristic of the optical filter 60 without changing the material and the structure of the PDP 1, so that cost reduction of the apparatus can be realized.

What is claimed is:

1. A gas is charge display apparatus including a plasma display panel utilizing at least one of neon and helium gases to generate a gas discharge for exciting a fluorescent material emitting red color, a fluorescent material emitting green color and a fluorescent material emitting blue color to display a color image on a display screen thereof, comprising:

an optical filter covering the entire screen and disposed in front of the plasma display panel, selectively absorbing light having a wavelength equal to that of light emission of the gas and having characteristics in which first and second peak absorbencies exist in a visible light wavelength range, a wavelength of a first peak absorbency has a value within a range of 580 to 600 nanometers and corresponds to the wavelength of the light emission of the gas, a wavelength of a second peak absorbency has a value within the range of 500 to 550 nanometers and corresponds to a wavelength of the fluorescent material emitting a green color, a transmittance of the optical filter at the first peak absorbency is 50% or less, and an average transmittance in a green wavelength range is larger than a transmittance at a first peak absorbency and is smaller than an average transmittance in the blue wavelength range.

2. A gas is charge display apparatus according to claim 1, comprising:

an optical filter having characteristics in which first and second peak absorbencies exist in the visible light wavelength range, a transmittance $T_{585}$ at a wavelength of 585 nanometers is smaller than each of a transmittance $T_{450}$ at a wavelength of 450 nanometers, a transmittance $T_{620}$ at a wavelength of 620 nanometers, and a transmittance $T_{525}$ at a wavelength of 525 nanometers is smaller than a transmittance $T_{450}$ at a wavelength of 450 nanometers.

3. The apparatus according to claim 1, wherein the transmittance $T_{585}$ is smaller than 0.7 times the transmittance $T_{450}$ and is smaller than the transmittance.

4. The apparatus according to claim 1, wherein the optical filter comprises a component separate from a display device having the gas discharge space therein, and is disposed in front of the display device.

5. The apparatus according to claim 1, wherein the optical filter is made of a film having said characteristics.

6. The apparatus according to claim 1, wherein the optical filter is in contact with the front surface of a transparent substrate comprising the display screen.

7. The apparatus according to claim 1, wherein the optical filter comprises an organic resin in which a substance absorbing light of a specific wavelength is dispersed.

8. The apparatus according to claim 1, further comprising a non-glare layer is disposed in front of the optical filter.

* * * * *

UNITED STATES PATENT AND TRADEMARK OFFICE

CERTIFICATE OF CORRECTION

PATENT NO. : 6,888,301 B1
APPLICATION NO. : 09/473047
DATED : May 3, 2005
INVENTOR(S) : Fumihiro Namiki et al.

It is certified that error appears in the above-identified patent and that said Letters Patent is hereby corrected as shown below:

First Page, Column 1 (Assignee), Line 1, delete “Fijitsu” and insert - - Fujitsu - - therefor.
First Page, Column 2 (Foreign Patent Documents), delete “EP 0966017 12/1999” (1st Entry).
Column 11, Line 38, delete “gas is charge” and insert - - gas discharge - - therefor.
Column 12, Line 17, delete “gas is charge” and insert - - gas discharge - - therefor.
Column 12, Line 30, after “Transmittance” insert - - $T_{525}$ - -.

Signed and Sealed this

Eighth Day of August, 2006

JON W. DUDAS
*Director of the United States Patent and Trademark Office*